US005418461A

United States Patent [19]

Maeda et al.

[11] Patent Number: 5,418,461

[45] Date of Patent: May 23, 1995

[54] DEVICE FOR DETECTING ABNORMALITY OF SPARK PLUGS FOR INTERNAL COMBUSTION ENGINES AND A MISFIRE-DETECTING SYSTEM INCORPORATING THE SAME

[75] Inventors: Kenichi Maeda; Yuichi Shimasaki; Eitetsu Akiyama; Takashi Hisaki; Shigeru Maruyama; Masaki Kanehiro; Takuji Ishioka; Kazutomo Sawamura, all of Wako, Japan

[73] Assignee: Honda Giken Kogyo Kabushiki Kaisha, Tokyo, Japan

[21] Appl. No.: 51,704

[22] Filed: Apr. 26, 1993

[30] Foreign Application Priority Data

Apr. 28, 1992 [JP] Japan ................................ 4-136022

[51] Int. Cl.[6] ...................... F02P 17/00; G01M 15/00

[52] U.S. Cl. .................................. 324/393; 324/399; 123/479; 73/117.3

[58] Field of Search ........ 324/378, 380, 388, 391-393, 324/399, 402; 123/198 F, 479, 481, 630; 73/117.3, 116

[56] References Cited

U.S. PATENT DOCUMENTS 3,942,102 3/1976 Kuhn et al. ........................ 324/399
3,961,240 6/1976 Pohl ................................... 324/399
4,163,192 7/1979 Sutphin, Jr. ......................... 324/388
4,825,167 4/1989 Bayba .................................. 73/116
4,918,389 4/1990 Schleupen et al. ................. 324/399
5,017,874 5/1991 Di Nunzio et al. ................. 324/378
5,269,282 12/1993 Miyata et al. ...................... 324/399

*Primary Examiner*—Sandra L. O'Shea
*Assistant Examiner*—Jay M. Patidar
*Attorney, Agent, or Firm*—Nikaido, Marmelstein, Murray & Oram

[57] ABSTRACT

A device according to an aspect of the invention detects abnormality of spark plugs of an internal combustion engine. A value related to electric resistance across a gap between electrodes of each spark plug is measured. Next, it is determined whether or not the measured value, related to the electric resistance, assumes a value indicating that the electric resistance is below a predetermined value, when the engine is determined to be in a non-combustive state. The spark plug is determined to be abnormal when it is determined that the measured value, related to the electric resistance, assumes the value indicating that the electric resistance is below the predetermined value. A misfire-detecting system according to another aspect of the invention incorporates the above device.

4 Claims, 8 Drawing Sheets

FIG.6A
FIG.6B
FIG.6C
FIG.6D
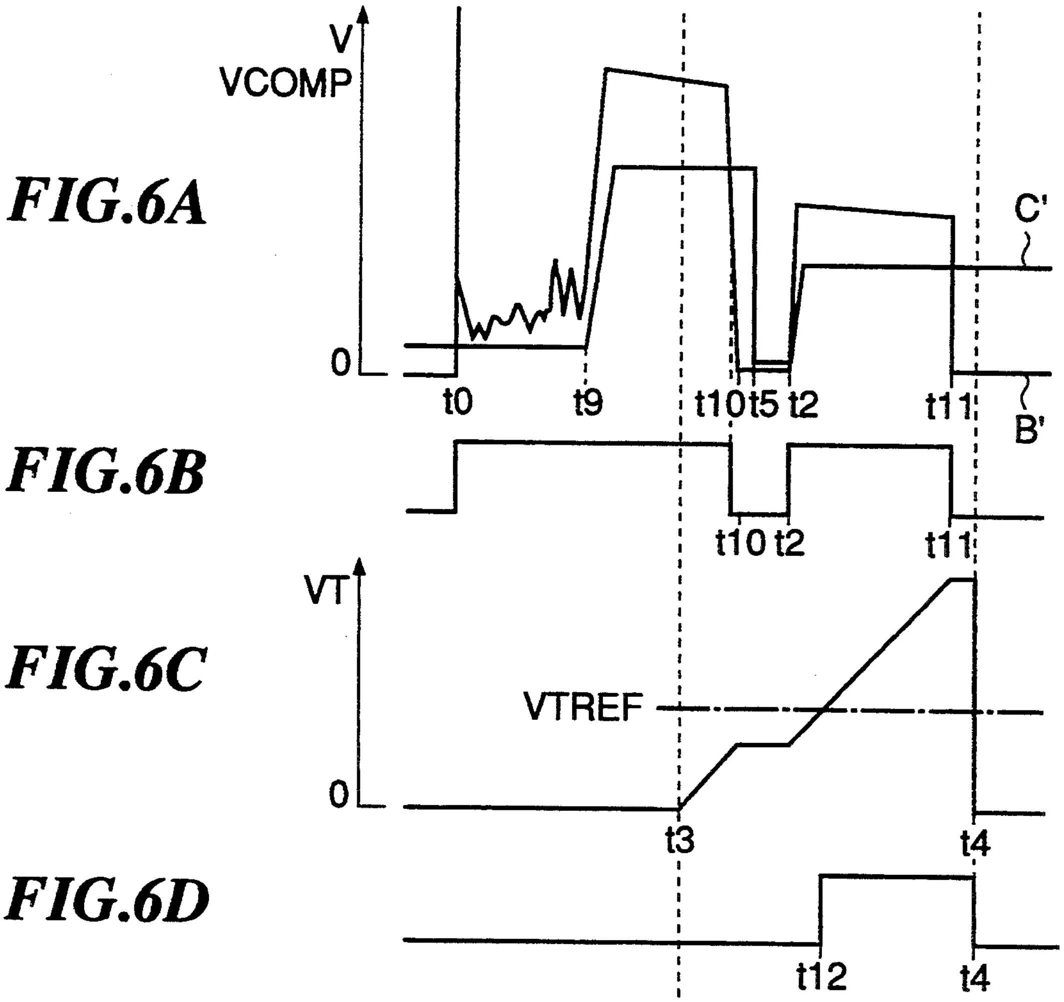
FIG.7A
FIG.7B
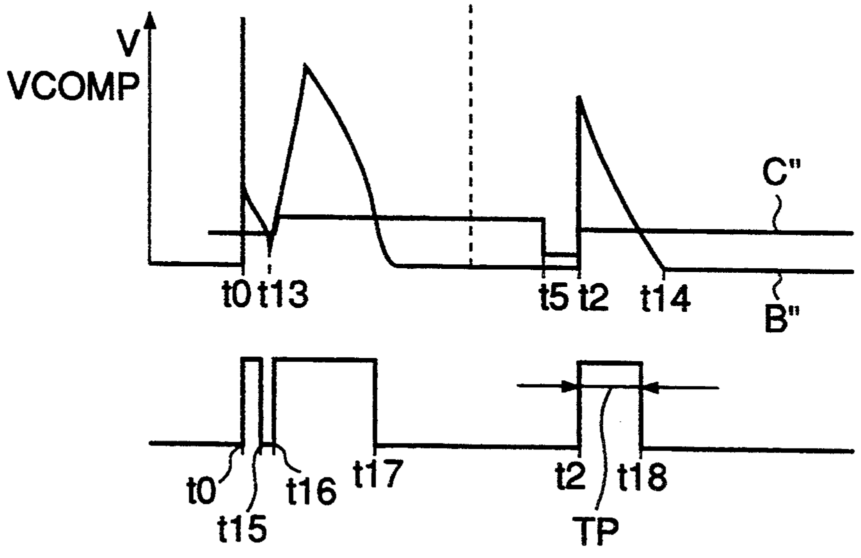

DEVICE FOR DETECTING ABNORMALITY OF SPARK PLUGS FOR INTERNAL COMBUSTION ENGINES AND A MISFIRE-DETECTING SYSTEM INCORPORATING THE SAME

BACKGROUND OF THE INVENTION

1. Field of the Invention

This invention relates to a device for detecting abnormality of spark plugs for internal combustion engines and a misfire-detecting system therefor incorporating the device.

2. Prior Art

In an internal combustion engine having spark plugs, a misfire can occur, in which normal ignition does not take place at one or more of the spark plugs. Misfires are largely classified into ones attributable to the fuel supply system and ones attributable to the ignition system. Misfires attributable to the fuel supply system are caused by the supply of a lean mixture or a rich mixture to the engine, while misfires attributable to the ignition system are caused by failure to spark (so-called mis-sparking), i.e. normal spark discharge does not take place at the spark plug, for example, due to smoking or wetting of the spark plug with fuel, particularly adhesion of carbon in the fuel or unburnt fuel to the spark plug, or abnormality in the sparking voltage supply system.

The present assignee has already proposed a misfire-detecting system for detecting misfires attributable to the fuel supply system, which comprises sparking voltage detecting means which detects sparking voltage, i.e. voltage across electrodes of the spark plug, and misfire-determining means which determines that a misfire has occurred based on a detected value of the sparking voltage, e.g. when a time period over which the detected value of the sparking voltage exceeds a predetermined reference value (Japanese Patent Application No. 3-326507 and corresponding U.S. Pat. No. 5,215,067).

On the other hand, in detecting misfires attributable to the ignition system, e.g. in detecting smoking of a spark plug, a measuring instrument or the like is conventionally used to directly measure resistance between the electrodes of the spark plug.

As stated above, when the performance a spark plug per se is degraded due to smoking thereof, etc. there is a possibility that normal spark discharge does not take place at the spark plug. However, the misfire-detecting system disclosed by the above-mentioned publications does not take this problem into consideration, and hence there remains an inconvenience to be eliminated for the purpose of enhancing the accuracy of misfire-detection. More specifically, when the combustion of the engine is unstable e.g. due to a low engine temperature, an unburnt fuel component (carbon) is deposited between the electrodes of a spark plug, i.e. between a central electrode and a grounding electrode. If carbon is deposited in a large amount, current supplied from the ignition coil to the central electrode eventually flows from the central electrode to the grounding electrode via the carbon deposited therebetween. Under such a condition of the spark plug, normal spark discharge does not take place, resulting in a misfire.

Therefore, it is necessary to detect the conditions of spark plugs per se, e.g. smoking thereof. However, it has been difficult to install a device for detecting the conditions of the spark plugs per se on an automotive vehicle, and therefore the resistance between the electrodes of the spark plugs has been directly measured by the use of a measuring instrument or the like as stated above. Thus, a misfire-detecting system for internal combustion engines which can detect a misfire with the conditions of spark plugs taken into account has not been realized yet.

SUMMARY OF THE INVENTION

It is a first object of the invention to provide a device for detecting abnormality of spark plugs of an internal combustion engine, which is capable of accurately detecting a misfire of the engine, with the conditions of the spark plugs taken into account.

It is a second object of the invention to provide a misfire-detecting system for an internal combustion engine, which has a function of detecting abnormality of spark plugs.

To attain the first object, according to a first aspect of the invention, there is provided a device for detecting abnormality of at least one spark plug of an internal combustion engine, the at least one spark plug having electrodes arranged with a gap therebetween.

The device according to the first aspect of the invention is characterized by comprising:

- electric resistance-measuring means for measuring a value related to electric resistance across the gap between the electrodes of the at least one spark plug;
- non-combustive state-determining means for determining whether the supply of fuel to the engine is interrupted indicating a non-combustive state;
- abnormal resistance-determining means for determining whether or not the value related to the electric resistance measured by the electric resistance-measuring means assumes a value indicating that the electric resistance is below a predetermined value, when the engine is in the non-combustive state; and
- plug condition-determining means for determining that the at least one spark plug is abnormal, when it is determined by the abnormal resistance-determining means that the value related to the electric resistance assumes the value indicating that the electric resistance is below the predetermined value.

Preferably, the electric resistance-measuring means comprises:

- voltage-measuring means for measuring voltage across the gap between the electrodes;
- voltage-applying means for applying a predetermined voltage across the gap between the electrodes; and
- voltage dropping rate-measuring means for measuring a rate of dropping of the voltage measured by the voltage-measuring means, after the predetermined voltage is applied across the gap between the electrodes by the voltage-applying means.

To attain the second object, according to a second aspect of the invention, there is provided a misfire-detecting system for an internal combustion engine, the engine including at least one a spark plug having electrodes arranged with a gap therebetween, the misfire-detecting system including engine operating parameter-detecting means for detecting operating parameters of the engine, ignition command signal-generating means for determining ignition timing based on the operating parameters of the engine and generating an ignition command signal at the ignition timing, igniting means for generating high voltage for causing electric discharge across the gap between the electrodes of the at least one spark plug, sparking voltage-detecting means for detecting sparking voltage when the high voltage is generated by the igniting means, and misfire-determining means for determining based on the sparking voltage detected by sparking voltage-detecting means whether a misfire has occurred in the engine.

The misfire-detecting system according to the second aspect of the invention is characterized by incorporating the above device, i.e. by comprising:

electric resistance-measuring means for measuring a value related to electric resistance across the gap between the electrodes of the at least one spark plug;

non-combustive state-determining means for determining whether the supply of fuel to the engine is interrupted indicating in a non-combustive state;

abnormal resistance-determining means for determining whether the value related to the electric resistance measured by the electric resistance-measuring means assumes a value indicating that the electric resistance is below a predetermined value, when the engine is in the non-combustive state; and plug condition-determining means for determining that the at least one spark plug is abnormal, when it is determined by the abnormal resistance-determining means that the value related to the electric resistance assumes the value indicating that the electric resistance is below the predetermined value.

The above and other objects, features, and advantages of the invention will become more apparent from the following detailed description taken in conjunction with the accompanying drawings.

BRIEF DESCRIPTION OF THE DRAWINGS

FIG. 5*a* to FIG. 5*e* collectively form a timing chart which is useful in explaining the operation of the misfire-detecting system at normal firing, in which:

FIG. 5*a* shows an energization control signal (ignition command signal) A;

FIG. 5*b* shows a gating signal G;

FIG. 5*c* shows changes in a comparative level VCOMP at normal firing to be compared with sparking voltage V;

FIG. 5*d* shows an output from a first comparator in FIG. 2; and

FIG. 5*e* shows an output from a pulse duration-measuring circuit in FIG. 2;

FIG. 6*a* to FIG. 6*d* collectively form a timing chart which is useful in explaining the operation of the misfire-detecting system at a misfire, in which:

FIG. 6*a* shows changes in the comparative level VCOMP at a misfire;

FIG. 6*b* shows an output from the first comparator, which is obtained at the misfire;

FIG. 6*c* shows an,output from the pulse duration-measuring circuit, which is obtained at the misfire; and FIG. 6*d* shows an output from a second comparator in FIG. 2, which is obtained at the misfire;

FIG. 7*a* and FIG. 7*b* collectively form a timing chart which is useful in explaining the principle of detecting abnormality of spark plugs by the device therefor according to the invention, in which:

FIG. 7*a* shows the sparking voltage V and the comparative voltage level VCOMP assumed when smoking of the spark plug occurs and the engine is under fuel cut, and FIG. 7*b* shows an output from the first comparator in FIG. 2;

DETAILED DESCRIPTION

The invention will now be described in detail with reference to the drawings showing an embodiment thereof.

Figure 1:
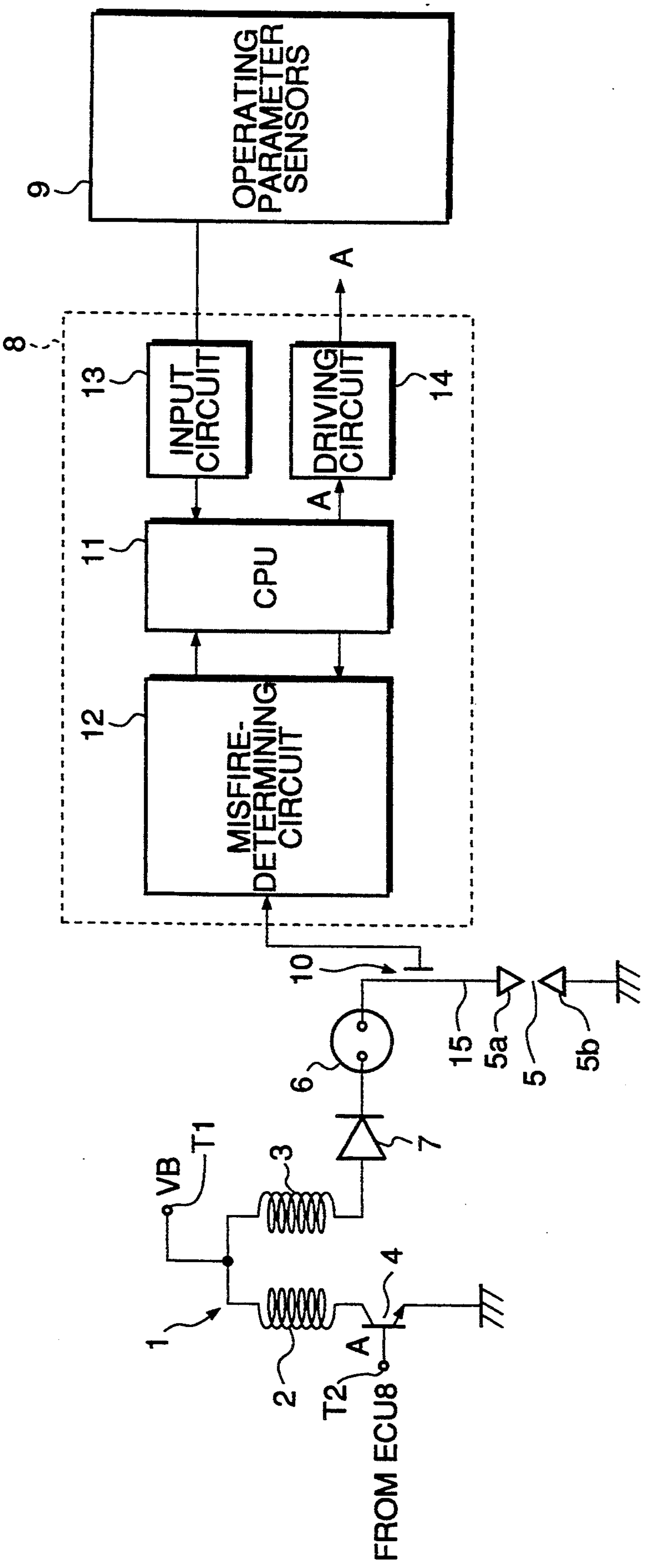
FIG. 1 is a block diagram showing the whole arrangement of a misfire-detecting system for an internal combustion engine incorporating a device for detecting abnormality of spark plugs of the engine, according to an embodiment of the invention.

Referring first to FIG. 1, there is shown the arrangement of a misfire-detecting system according to a first embodiment of the invention, which is incorporated in an internal combustion engine. A feeding terminal T1, which is supplied with supply voltage VB for the ignition device from a battery, not shown, is connected to an ignition coil 1 comprised of a primary coil 2 and a secondary coil 3 therefor. The primary and secondary coils 2, 3 are connected with each other at ends thereof. The other end of the primary coil 2 is connected to a collector of a transistor 4. The transistor 4 has its base connected to an input terminal T2 through which is supplied an ignition command signal A from an electronic control unit (hereinafter referred to as "the ECU") 8, to be supplied with the ignition command signal A. The other end of the secondary coil 3 is connected to an anode of a diode 7, which in turn has its cathode connected via a distributor 6 to a center electrode **5*a* of each spark plug 5. The spark plug 5 has its grounding electrode 5*b*** grounded.

A sparking voltage sensor 10 is provided at an intermediate portion of a connecting line 15 which connects between the distributor 6 and the center electrode **5*a*. The sensor 10 is electrostatically coupled to the connecting line 15 and forms together therewith a capacitance of several pF's, and its output is connected to a misfire-determining circuit 12 of the ECU 8. The misfire-determining circuit 12 is connected to a central processing unit (hereinafter referred to as "the CPU") 11 to supply results of its determination of a misfire thereto. The CPU 11** carries out timing control related to the misfire determination.

Connected to the CPU 11 are various operating parameter sensors, designated by reference numeral 9, which sense various operating parameters of the engine including engine rotational speed and supply the sensed values of the operating parameters to the CPU 11 via an input circuit 13. The CPU 11 is connected to the base of the transistor 4 via a driving circuit 14 to supply the ignition command signal A as an energization control,-signal to the transistor 4.

Figure 2:
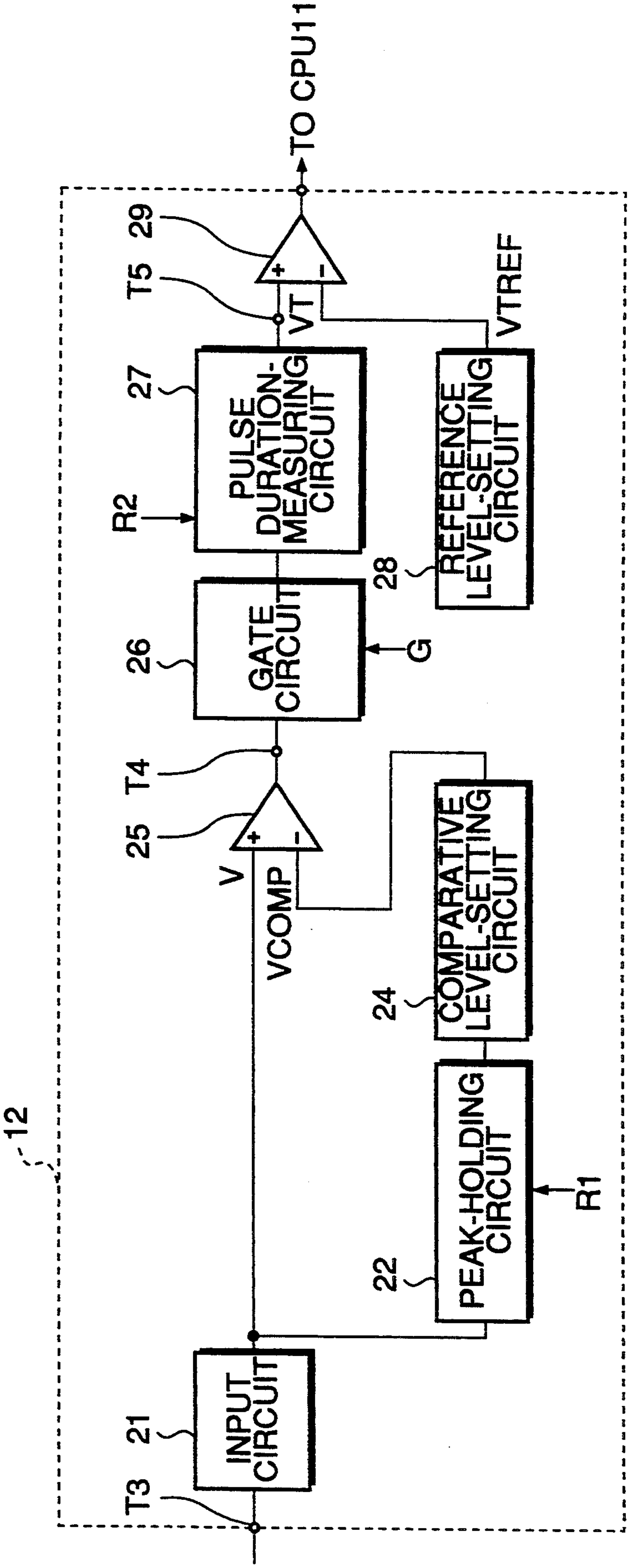
FIG. 2 is a circuit diagram showing details of a misfire-determining circuit appearing in FIG. 1.

FIG. 2 shows details of the misfire-determining circuit 12. An input terminal T3 thereof is connected via an input circuit 21 to a non-inverting input terminal of a first comparator 25, as well as to an input of a peak-holding circuit 22. The output of the peak-holding circuit 22 is connected via a comparative level-setting circuit 24 to an inverting input terminal of the first comparator 25. The peak-holding circuit 22 is supplied with a resetting signal R1 from the CPU 11 for resetting at an appropriate time a peak value of the sparking voltage held by the peak-holding circuit 22.

An output from the first comparator 25 is supplied to a pulse duration-measuring circuit 27 via a gate circuit 26. The pulse duration-measuring circuit 27 measures a time duration during which an output from the first comparator 25 assumes a high level, within a gating time during which the gate circuit 26 permits an input thereto to be output as it is, and the circuit 27 supplies an output voltage VT corresponding to the measured time duration to a non-inverting input terminal of a second comparator 29. A reference level-setting circuit 28 is connected to an inverting input terminal of the second comparator 29 to supply the same with a reference voltage VTREF for misfire determination. When VT>VTREF stands, the second comparator 29 generates a high level output indicating that a misfire such as an FI misfire attributable to the fuel supply system of the engine has occurred. The reference voltage VTREF of the reference level-setting circuit 28 is varied in response to engine operating parameters. The CPU 11 also supplies the gate circuit 26 and the pulse duration-measuring circuit 27 with a gating signal G which determines the gating time and a resetting signal R2 which determines the timing of resetting the pulse duration-measuring circuit 27, respectively.

Figure 3:
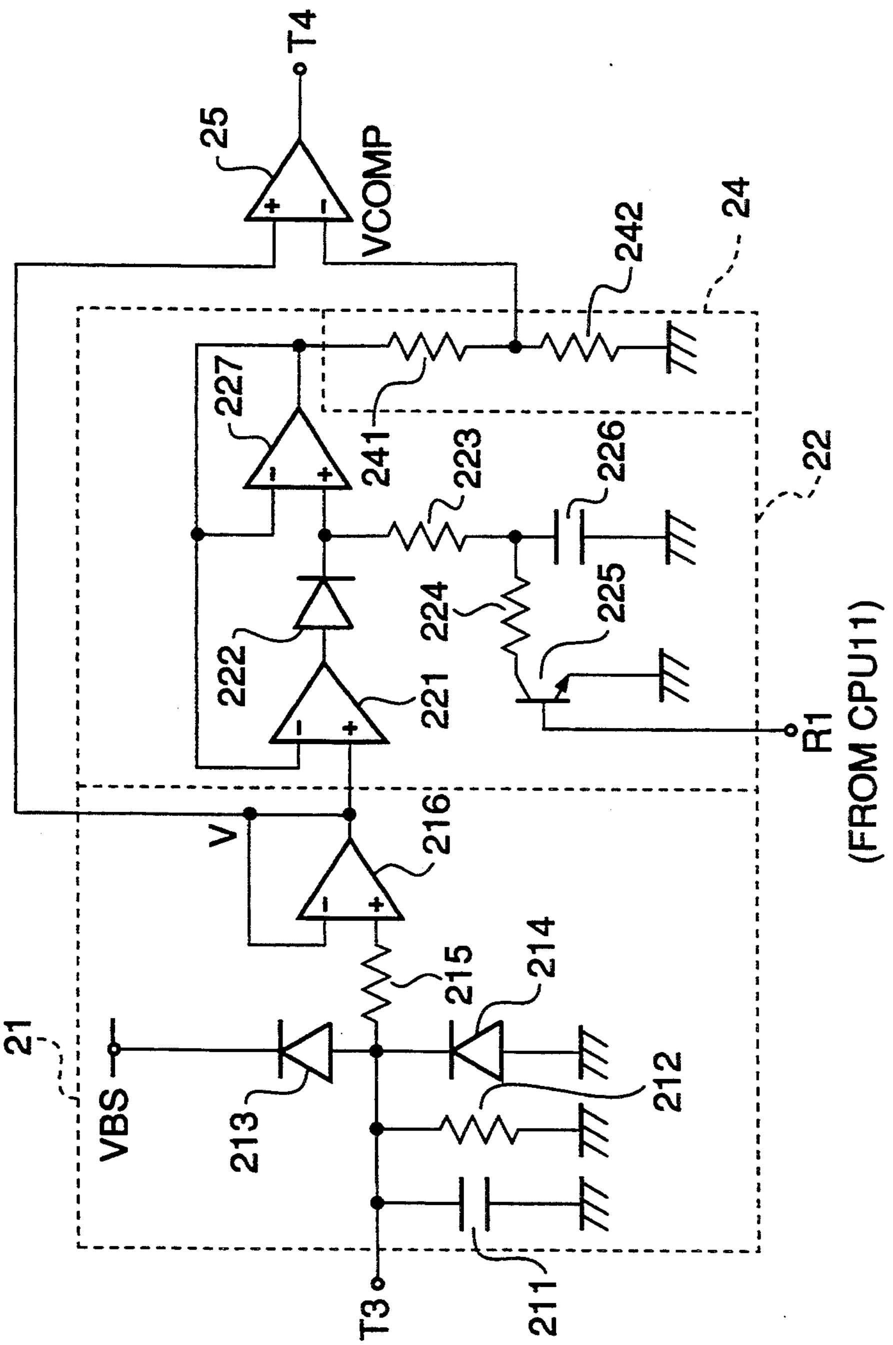
FIG. 3 is a circuit diagram showing details of parts of the misfire-determining circuit.

FIG. 3 shows details of the input circuit 21, the peak-holding circuit 22 and the comparative level-setting circuit 24 in FIG. 2. As shown in the figure, an input terminal T3 is connected to a non-inverting input terminal of an operational amplifier 216 via a resistor 215. The input terminal T3 is grounded via a circuit formed of a capacitor 211, a resistor 212, and a diode 214, which are connected in parallel, and connected to a supply voltage-feeding line VBS via a diode 213.

The capacitor 211 has a capacitance of $10^4$pF, for example, and serves to divide voltage detected by the sparking voltage sensor 10 into one over several thousands. The resistor 212 has a value of 500 KΩ, for example. The diodes 213 and 214 act to control the input voltage to the operational amplifier 216 to a range of 0 to VBS. An inverting input terminal of the operational amplifier 216 is connected to the output of the same so that the operational amplifier 216 operates as a buffer amplifier (impedance converter).

The output of the operational amplifier 216 is connected to the non-inverting input terminal of the first comparator 25 as well as a non-inverting input terminal of an operational amplifier 221. The output of the operational amplifier 221 is connected to a non-inverting input terminal of an operational amplifier 227 via a diode 222, with inverting input terminals of the amplifiers 221, 227 both connected to the output of the amplifier 227. Therefore, these operational amplifiers form a buffer amplifier.

The non-inverting input terminal of the operational amplifier 227 is grounded via a resistor 223 and a capacitor 226, the junction therebetween being connected to a collector of a transistor 225 via a resistor 224. The transistor 225 has its emitter grounded and its base supplied with the resetting signal R1 from the CPU 11. The resetting signal R1 goes high when resetting is to be made.

The output of the operational amplifier 227 is grounded via resistors 241 and 242 forming the comparative level-setting circuit 24, the junction between the resistors 241, 242 being connected to the inverting input terminal of the comparator 25.

The circuit of FIG. 3 operates as follows: A peak value of the detected sparking voltage V (output from the operational amplifier 216) is held by the peak-holding circuit 22, the held peak value is multiplied by a predetermined value smaller than 1 by the comparative level-setting circuit 24, and the resulting product is applied to the first comparator 25 as the comparative level VCOMP. Thus, a pulse signal indicative of the comparison result, which goes high when V>VCOMP stands, is output from the first comparator 25 through a terminal T4.

Figure 4:
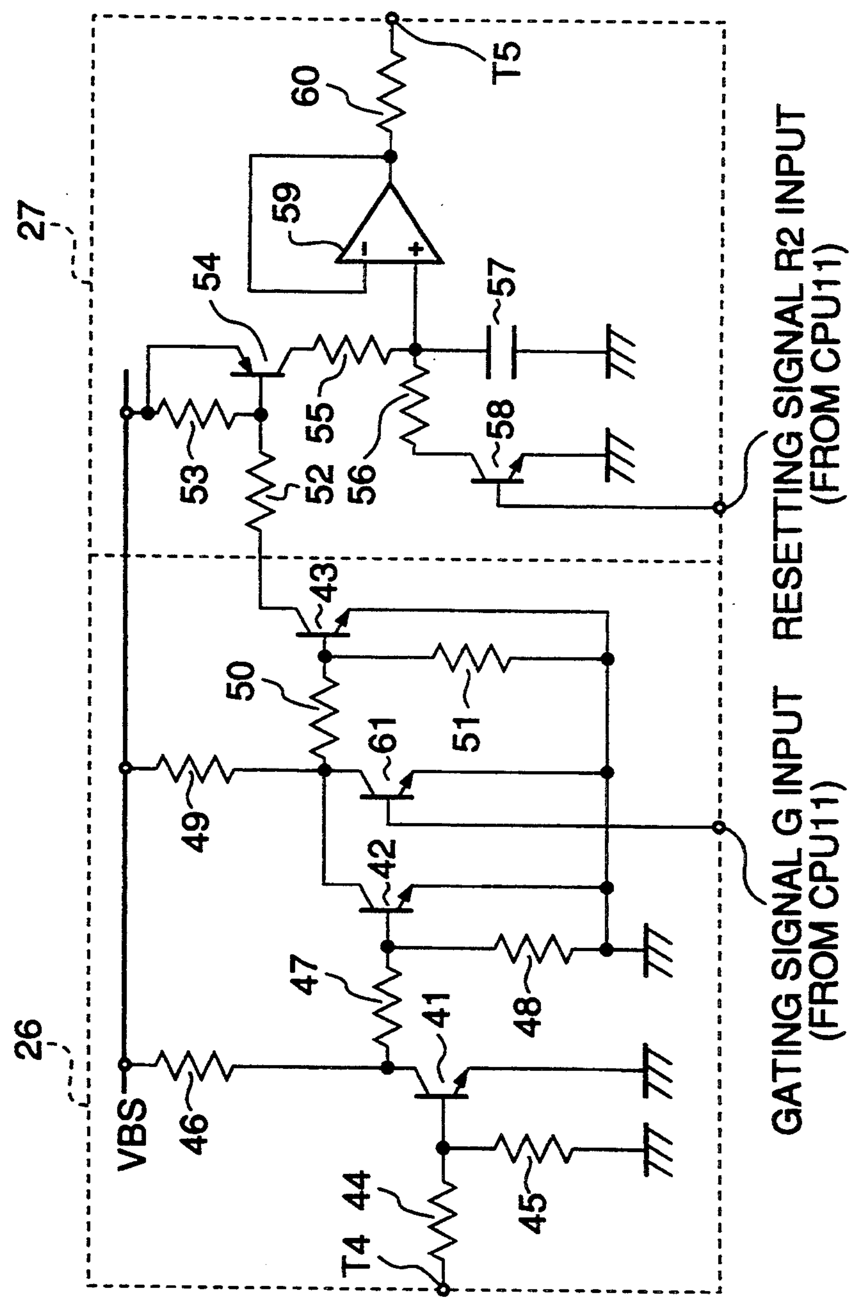
FIG. 4 is a circuit diagram showing details of other parts of the misfire-determining circuit.

FIG. 4 shows details of the construction of the gate circuit 26 and the pulse duration-measuring circuit 27. A three-stage invertor circuit is formed by transistors 41–43 and resistors 44–51. Connected between a collector of the transistor 42 and ground is a transistor 61 with a base thereof disposed to be supplied with the gating signal G from the CPU 11. Therefore, during the gating time during which the gating signal G assumes a low level, the collector of the transistor 43 goes low or high as the potential at the terminal T4 goes high or low, whereas when the gating signal G assumes a high level, the collector of the transistor 43 remains at a high level irrespective of the potential at the terminal T4. The collector of the transistor 43 is connected to a base of a transistor 54 via a resistor 52, which has its base connected to the supply voltage-feeding line VBS via a resistor 53, its emitter directly connected to the line VBS, and its collector grounded via a resistor 55 and a capacitor 57. The junction between the resistor 55 and the capacitor 57 is connected to a terminal T5 via an operational amplifier 59 and a resistor 60. The operational amplifier 59 serves as a buffer amplifier. The junction between the resistor 55 and the capacitor 57 is connected via a resistor 56 to a collector of a transistor 58 which has its emitter grounded and its base disposed to be supplied with the resetting signal R2 from the CPU 11.

The circuit of FIG. 4 operates as follows: When the potential at the terminal T4 goes high while the gating signal G is at a low level, the potential at the collector of the transistor 43 goes low so that the transistor 54 turns on to cause charging of the capacitor 57. On the other hand, when the potential at the terminal T4 goes low or when the gating signal G goes high, the transistor turns off to stop charging of the capacitor 57. Therefore, the terminal T5 is supplied with a voltage VT having a value corresponding to the time period during which the pulse signal input through the terminal T4 assumes a high level.

Figures 5A, 5B, 5C, 5D, 5E:
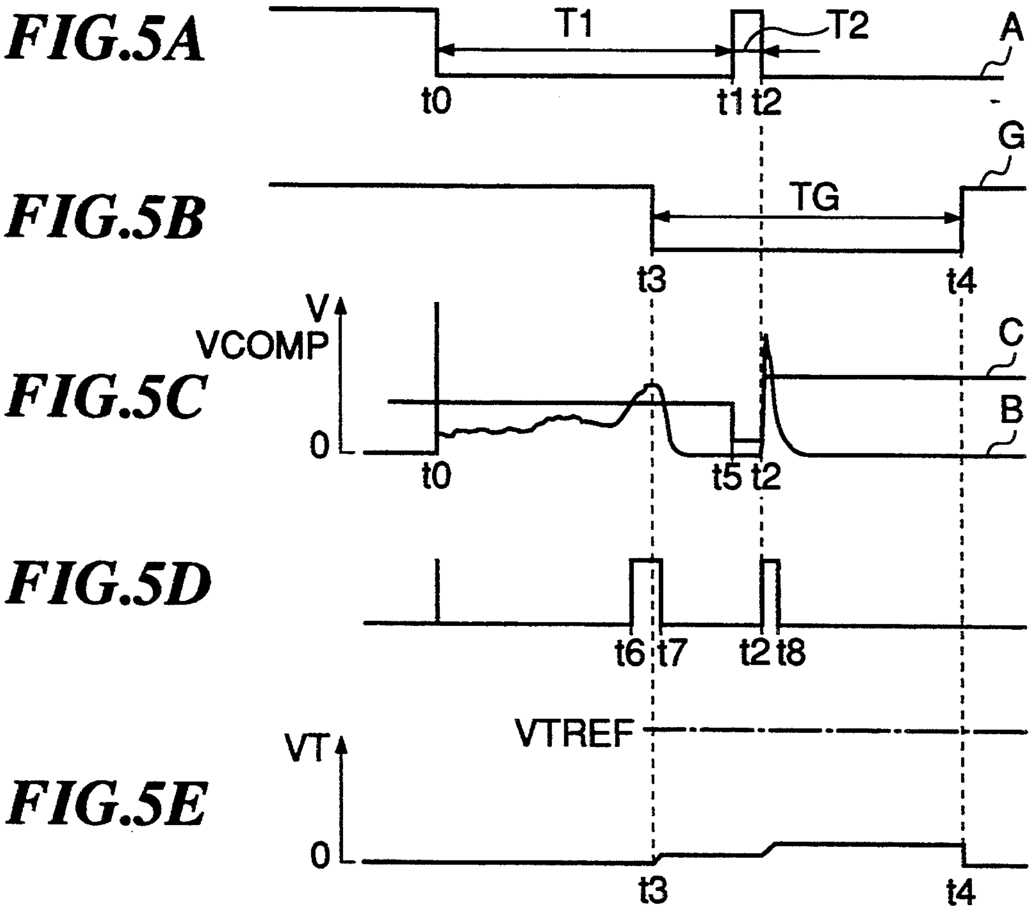

The operation of the misfire-detecting system constructed as above according to the present embodiment will now be explained with reference to a timing chart formed by FIG. 5*a* to FIG. 5*e*, one formed by FIG. 6*a* to FIG. 6*d*, one formed by FIG. 7*a* and FIG. 7*b*, FIG. 8 and FIG. 9. FIGS. 5*a* and 5*b* show the energization control signal A and the gating signal G, respectively. FIG. 5*c* to FIG. 5*e* show operation at normal firing, while FIG. 6*a* to FIG. 6*d* show operation at a misfire attributable to the fuel supply system (hereinafter referred to as "FI misfire"). Further, FIG. 7a and FIG. 7b show characteristics of the sparking voltage exhibited at an FI misfire when the spark plug is abnormal.

As shown in FIG. 5a, according to the present embodiment, after the ignition command signal is generated at a time point t0, i.e. after the supply of current to the primary coil 2 is cut off after the coil 2 has been energized for a time period required for causing spark ignition, the coil 2 is again energized from a time point t1 to a time point t2 (hereinafter referred to as "reenergization"). This reenergization is carried out in such a manner that a voltage is applied between the electrodes of the spark plug 5 at the time point t2, which has such a low predetermined value as does not cause discharge between the electrodes, whereby electric charge is stored in floating capacitance between the spark plug 5 and its peripheral circuit parts. The voltage applied to the spark plug 5 at the time point t2 will be hereinafter referred to as the recharging voltage.

FIG. 5c and FIG. 6a show changes in the detected sparking voltage (output voltage from the input circuit 21) V (B, B') and changes in the comparative level VCOMP (C, C') with the lapse of time. First, a sparking voltage characteristic obtainable in the case of normal firing will be explained with reference to FIG. 5c.

Immediately after the time point t0 the ignition command signal A is generated, sparking voltage V rises to such a level as to cause dielectric breakdown of the mixture between the electrodes of the spark plug, i.e. across the discharging gap of the spark plug. After occurrence of the dielectric breakdown, the discharge state shifts from a capacitive discharge state before the dielectric breakdown (early-stage capacitive discharge), which state has a very short duration with several hundreds amperes of current flow, to an inductive discharge state which has a duration of several milliseconds and where the sparking voltage assumes almost a constant value with several tens milliamperes of current flow. The inductive discharge voltage rises with an increase in the pressure within the engine cylinder caused by the compression stroke of the piston executed after the time point t0, since a higher voltage is required for inductive discharge to occur as the cylinder pressure increases. At the final stage of the inductive discharge, the voltage between the electrodes of the spark plug lowers below a value required for the inductive discharge to continue, due to decreased inductive energy of the ignition coil so that the inductive discharge ceases and again capacitive discharge (late-stage capacitive discharge) occurs. In this capacitive discharge state, the voltage between the spark plug electrodes again rises, i.e. in the direction of causing dielectric breakdown of the mixture. However, since the ignition coil 1 then has a small amount of residual energy, the amount of rise of the voltage is small. This is because the electrical resistance of the discharging gap is low due to ionizing of the mixture during firing.

In this connection, at normal firing, the charge stored in the floating capacitance between the diode 7 and the spark plug (i.e. residual charge left after the discharge) is not discharged toward the ignition coil 1 due to the presence of the diode 7, but neutralized by ions present in the vicinity of the electrodes of the spark plug 5, so that the sparking voltage V promptly declines after the,termination of the capacitive discharge.

Thereafter, when the recharging voltage is applied to the spark plug at the time point t2, the sparking voltage V again rises. The electric charge charged in the floating capacitance by the application of the recharging voltage is neutralized by ions present in the vicinity of the electrodes of the spark plug 5 to promptly decline, similarly to the state immediately after termination of the late-stage capacitive discharge.

The comparative level VCOMP obtained from the peak held value of the sparking voltage V assumes, until a time point t5, a value corresponding to a peak-held value of sparking voltage V obtained after resetting of the peak-holding circuit 22 on the last occasion, in the illustrated example. When the peak-holding circuit 22 is reset at the time point t5 by the resetting signal R1, the comparative level VCOMP is held at a predetermined low level (>0 volts) until the time point t2, whereupon the predetermined low level or reset state is canceled (hereinafter, the timing of canceling the predetermined low level state will be referred to as "the resetting (initialization) timing"). Therefore, after the time point t2 the comparative level VCOMP shows a value dependent on a peak value of the sparking voltage V caused by the recharging voltage after the peak-holding circuit 22 was reset at the time point t5. In the present embodiment, the comparative level VCOMP is set to approximately two thirds of the peak value. As a result, the output from the first comparator 25 which compares between the sparking voltage V and the comparative level VCOMP assumes a high level at or about the time point t0, between time points t6 and t7, and between time,points t2 and t8, as shown in FIG. 5d, whereas the output from the gate circuit 26 assumes a high level only between time points t3 and t7 and between time points t2 and t8, within the gating time TG during which the gating signal G is at a low level. Accordingly, the output VT from the pulse duration-measuring circuit 27 changes as shown in FIG. 5e, that is, it does not exceed the reference voltage VTREF, so that it is determined that the engine is in a normal firing state.

Next, a sparking voltage characteristic will be described, which is obtained when an FI misfire occurs, i.e. no firing occurs, due to supply of a lean mixture to the engine or cutting-off of the fuel supply to the engine caused by faulty operation of the fuel supply system, etc. In FIG. 6a, immediately after the time point t0 of generation of the ignition command signal A, the sparking voltage V (B') rises above a level causing dielectric breakdown of the mixture. In this case, the ratio of air in the mixture is greater than when the mixture supplied to the engine has an air-fuel ratio close to the stoichiometric ratio, and accordingly the dielectric strength of the mixture is high. Besides, since the mixture is not fired, it is not ionized so that the electrical resistance of the discharging gap of the spark plug is high. Consequently, the dielectric breakdown voltage becomes higher than that obtained in the case of normal firing of the mixture. Thereafter, the discharge state shifts to an inductive discharge state, as in the case of normal firing. However, the electrical resistance of the discharging gap of the spark plug at the discharge is greater in the case of supply of a lean mixture, etc. than that in the case of normal firing so that the inductive discharge state tends to shift to a capacitive discharge state earlier than in the case of normal firing. The capacitive discharge occurring after termination of the inductive discharge (late-stage capacitive discharge) is much higher than that at normal firing, because the voltage of dielectric breakdown of the mixture is higher than that at normal firing.

On this occasion, almost no ion is present in the vicinity of the electrodes of the spark plug 5 so that the charge stored between the diode 7 and the spark plug 5 is not neutralized, nor is it allowed to flow backward to the ignition coil 1 due to the presence of the diode 7. Therefore, the charge is held as it is without being discharged through the electrodes of the spark plug 5. Then, when the pressure within the engine cylinder lowers so that the voltage between the electrodes of the spark plug 5 required for discharge to occur becomes equal to the voltage applied by the charge, there occurs a discharge between the electrodes of the spark plug 5. As the sparking voltage V is higher, the discharge takes place earlier.

Thereafter, at the time point t2, the recharging voltage is applied to the spark plug 5. As a result, the sparking voltage V again rises. On this occasion, as mentioned above, there is almost no ion present between the electrodes of the spark plug and hence the charge stored between the diode 7 and the spark plug 5 is not neutralized, so that the sparking voltage V is held in a high voltage state due to the presence of the diode 7. As the pressure within the cylinder further lowers so that the voltage between the electrodes of the spark plug 5 required for discharge to occur becomes equal to the voltage applied by the charge, there occurs a discharge between the electrodes of the spark plug 5 (at a time point t11).

On the other hand, the comparative level VCOMP (C') assumes, until a time point t9, a value corresponding to a peak-held value of sparking voltage V (approximately two thirds of the peak-held value) obtained after resetting of the peak-holding circuit 22 on the last occasion, in the illustrated example. After the time point t9, the comparative level VCOMP rises with a rise in the sparking voltage V and thereafter is maintained at a value dependent upon a peak value of the sparking voltage V until the time point t5. When the peak-holding circuit 22 is reset at the time point t5 by the resetting signal R1, the comparative level VCOMP is held at a predetermined low level (>0 volts) until the time point t2. After the time point t2 the comparative level VCOMP is maintained at a value dependent on a peak value of the sparking voltage V caused by the application of the recharging voltage. As a result, the output from the first comparator 25 assumes a high level between the time point t0 and the time point t10 and between the time point t2 to the time point t11, as shown in FIG. 6*b*, whereas the output from the gate circuit 26 assumes a high level only during time periods when the output from the first comparator 25 assumes a high level within the gating time TG. Accordingly, the output VT from the pulse duration-measuring circuit 27 changes as shown in FIG. 6*c*, that is, it exceeds the reference voltage VTREF at a time point t12, so that the output from the second comparator 29 assumes a high level between time points t12 and t4 as shown in FIG. 6*d*, resulting in a determination that an FI misfire has occurred.

As shown in FIG. 6*a*, in the case where the sparking voltage V rises to a relatively high level during the late-stage capacitive discharge, the sparking voltage V declines at an early time (at the time point t10), at which the output VT from the pulse duration-measuring circuit 27 does not yet exceed the reference voltage VTREF, resulting in failure to detect an FI misfire. To eliminate this inconvenience, according to the present embodiment, the recharging voltage is applied to the spark plug 5 at the time point t2, at a voltage value lower than a voltage value causing discharge between the electrodes of the spark plug. Therefore, even when the sparking voltage V assumes a high voltage value, an FI misfire can be detected without fail.

The misfire-detecting system according to the present embodiment has a function of detecting abnormality of spark plugs 5 according to a program described hereinafter with reference to FIG. 8. Next, description will be made of the detection of abnormality of spark plugs.

First, sparking voltage characteristics exhibited by a spark plug suffering from smoking will be explained with reference to FIG. 7*a*, in which are shown a change in the sparking voltage V and a change in the comparative voltage level VCOMP occurring with the spark plug suffering from smoking under fuel cut (i.e. in a non-combustive state of the engine in which the supply of fuel to the engine is interrupted, which will occur when the engine is decelerating or is intentionally established by setting spark plug-monitoring conditions).

Immediately after the time point t0 the ignition command signal A is generated, sparking voltage V (B'') rises to such a level as to cause dielectric breakdown of the mixture between the electrodes of the spark plug, and then drops promptly. This is because carbon is deposited on the spark plug to form islands between the electrodes of the spark plug when the spark plug smokes, so that electric current flows between the electrodes via the islands. At a time point t13 the sparking voltage V has dropped to a certain level, the discharge state shifts from the inductive discharge state to a capacitive discharge state, so that the sparking voltage rises due to residual electric energy of the ignition coil 1. However, due to flow of current between the electrodes via the carbon islands, the sparking voltage V then drops relatively promptly similarly to the above.

Then, at the time point t2, the recharging voltage is applied between the electrodes to cause the sparking voltage V to rise again. In the present case, however, electric current leaks via the carbons deposited between the electrodes, so that the sparking voltage V then drops at a larger rate than in the FIG. 6*a* case where a misfire occurs with a normal spark plug, in spite of the fact that no neutralization by ions between the electrodes of the spark plug occurs. Consequently, the capacitive discharge terminates earlier in the present case at a time point t14. As a result, as shown in FIG. 7*b*, the output from the first comparator 25 which compares the sparking voltage V (B'') with the comparative level VCOMP (C'': set to approximately one fifth of the peak-held value of the sparking voltage V as mentioned hereinbefore) assumes a high level in the vicinity of a time point t15, between time points t16 and t17, and between time points t2 and t18. However, the pulse duration TP from the time point t2 to the time point t18 is shorter than that (from the time point t2 to the time point t11) in the normal spark plug case shown in FIG. 6*b*. In the present embodiment, abnormality of a spark plug is detected based on the pulse duration TP resulting from the sparking voltage V after application of the recharging voltage between the electrodes of the spark plug.

Next, a manner of determining abnormality of spark plugs, which forms a unique feature of the invention, will be described with reference to FIG. 8 and FIG. 9. FIG. 8 shows a program for determining abnormality of the spark plugs, while FIG. 9 shows different manners of fall in the sparking voltage V after application of the recharging voltage for comparison, one being obtained by a normal spark plug and the other by a faulty spark plug.

Figure 8:
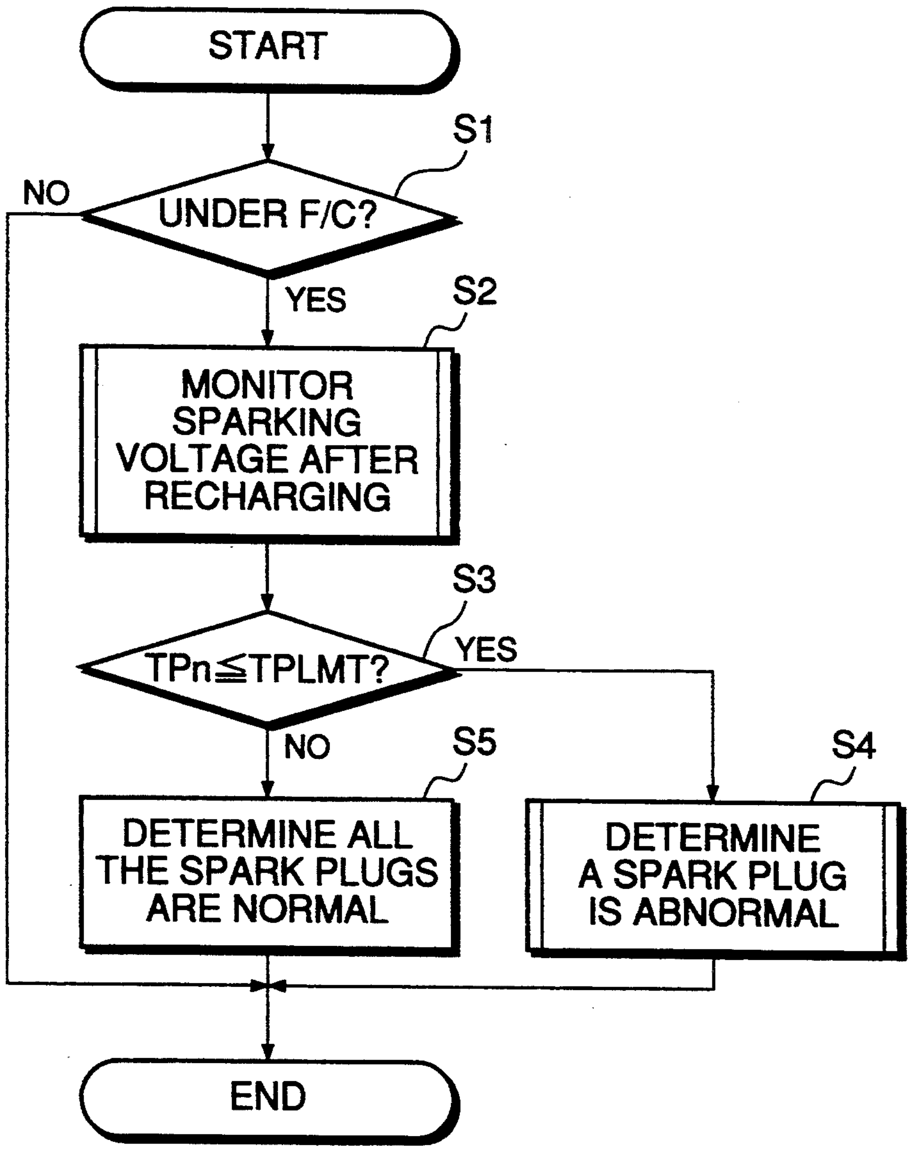
FIG. 8 shows a flowchart of a program for determining abnormality of spark plugs.
Figure 9:
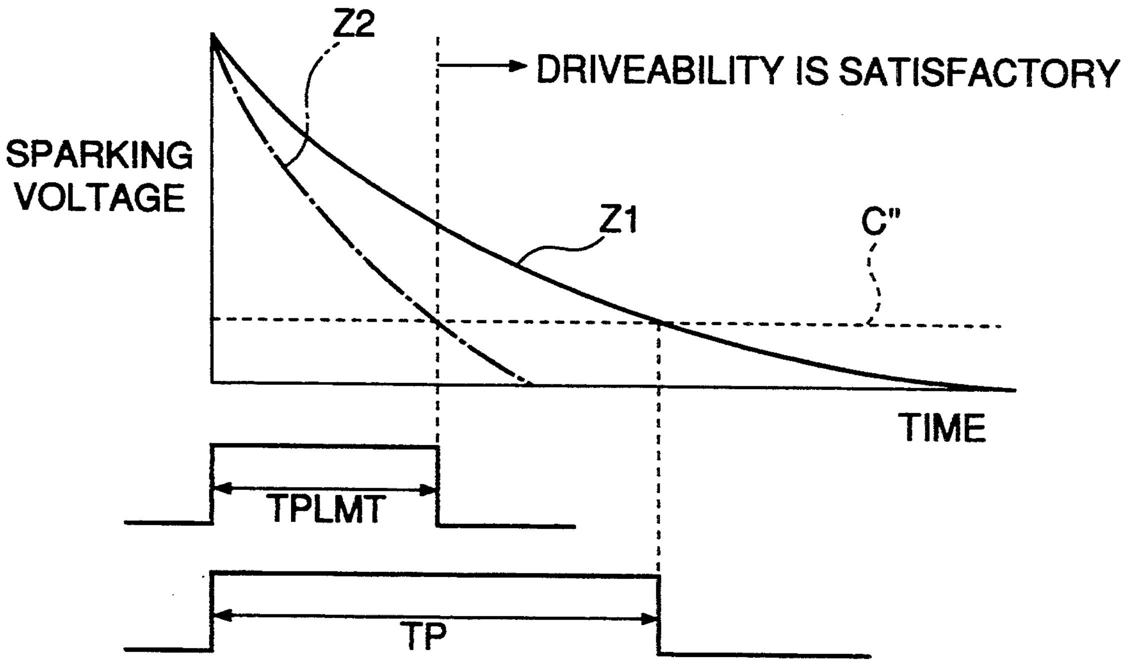
FIG. 9 is a graph illustrating how the sparking voltage falls after recharging of the ignition coil, which is useful in explaining how a limit value TPLMT of a pulse duration TP is determined.

Referring to FIG. 8, first at a step S1, it is determined whether or not the engine is under fuel cut. If the answer to this question is negative (NO), i.e. if the engine is not under fuel cut, the present routine is immediately terminated, whereas if the answer is affirmative (YES), i.e. if the engine is under fuel cut, the program proceeds to a step S2.

At the step S2, the comparative level is changed. That is, to monitor the conditions of the spark plugs for detection of abnormality thereof, the comparative level, which has been set to approximately two thirds of a peak-held value of the sparking voltage V to detect a misfire, is changed to approximately one fifth of the peak-held value (as indicated by C″ in FIG. 7*a*). This change is made for enhancing the accuracy of abnormality detection in view of the fact that the sparking voltage V falls at a larger rate when the condition of a spark plug under diagnosis is degraded than when it is normal. Further, at the step S2, the sparking voltage V after application of the recharging voltage at the aforementioned time point t2 is monitored with respect to each of the cylinders. In this connection, when attention is paid to the sparking voltage V after application of the recharging voltage as shown in FIG. 9, a time period required for the sparking voltage V to fall to the comparative level VCOMP exhibits a large variation depending on the degree of smoking of the spark plug (and hence on resistance across the gap between the electrodes of the spark plug). More specifically, the above-mentioned time period becomes shorter as the degree of smoking is higher, i.e. as the resistance across the gap between the electrodes of the spark plug is lower (in FIG. 9, Z1 indicates a voltage declining characteristic of a normal spark plug while Z2 that of a faulty spark plug suffering from smoking). Therefore, this variation in the voltage declining characteristic is utilized in determining whether or not a spark plug is normal, by experimentally determining a value of the resistance across the gap between the electrodes of the spark plug below which the drivability of the engine is degraded, and setting, based on the experimentally determined value of the resistance, a limit value TPLMT, below which the drivability of the engine can be degraded.

At the following step S3, it is determined whether or not the pulse duration TP as the output from the first comparator 25 is equal to or smaller than the limit value TPLMT. This procedure is carried out by reading the number of each cylinder beforehand to identify each cylinder, and repeatedly carrying out the above determination for each cylinder. If the answer to the question of the step S3 is affirmative (YES), i.e. if it is consecutively determined a predetermined number of times for a certain cylinder that the pulse duration TP is equal to or smaller than the limit value TPLMT, it is determined at a step S4 that the spark plug of the cylinder is abnormal.

On the other hand, if the answer to the question of the step S3 is negative (NO), i.e. if it is determined for all the cylinders that the pulse duration TP is larger than the limit value TPLMT, it is determined at a step S5 that the spark plugs of all the cylinders are normal, followed by terminating the program.

In this manner, according to the present embodiment, abnormality of a spark plug of each cylinder is determined by monitoring the sparking voltage after application of the recharging voltage to the spark plug, when the engine is under fuel cut, which makes it possible to accurately measure the resistance across a gap between the electrodes without being adversely affected by combustion of the air-fuel mixture. Further, according to the present embodiment, a misfire-detecting system, which is slightly modified in construction for abnormality detection, can be applied to the invention to detect a misfire with even higher accuracy while detecting abnormality of spark plugs.

Further, the present invention is not limited to the embodiment described above with reference to the drawings, but it may be modified in various ways. For example, although the abnormal condition of a spark plug is represented by a "smoking" state thereof in the above described embodiment, this is not limitative, but the present invention may be applied in a case where the width of a gap between the electrodes of a spark plug is reduced due to a shock upon an accidental fall of the spark plug, and this damaged spark plug is mounted in an engine. Further, although, in the above described embodiment, it is determined that a misfire has occurred when a time period over which the sparking voltage exceeds a predetermined comparative level is larger than a predetermined reference value, this is not limitative, but a misfire determination may be carried out by other methods based e.g. on the sparking voltage, disclosed e.g. by Japanese Patent Application No. 3-326506 and corresponding U.S. Pat. No. 5,327,090.

What is claimed is:

1. A device for detecting abnormality of at least one spark plug of an internal combustion engine, said at least one spark plug having electrodes arranged with a gap therebetween, said device comprising:

electric resistance-measuring means for measuring a value related to electric resistance across said gap between said electrodes of said at least one spark plug;

non-combustion state-determining means for determining whether the supply of fuel to the engine is interrupted indicating a non-combustive state;

abnormal resistance-determining means for determining whether said value related to said electric resistance measured by said electric resistance-measuring means assumes a value indicating that said electric resistance is below a predetermined value, when said engine is in said non-combustive state; and plug condition-determining means for determining that said at least one spark plug is abnormal, when it is determined by said abnormal resistance-determining means that said value related to said electric resistance assumes said value indicating that said electric resistance is below said predetermined value.

2. A device according to claim 1, wherein said electric resistance-measuring means comprises:

voltage-measuring means for measuring voltage across said gap between said electrodes;

voltage-applying means for applying a predetermined voltage across said gap between said electrodes; and voltage dropping rate-measuring means for measuring a rate of dropping of said voltage measured by said voltage-measuring means, after said predetermined voltage is applied across said gap between said electrodes,by said voltage-applying means.

3. In a misfire-detecting system for an internal combustion engine, said engine including at least one a spark plug having electrodes arranged with a gap therebetween, said misfire-detecting system including engine operating parameter-detecting means for detecting operating parameters of said engine, ignition command signal-generating means for determining ignition timing based on said operating parameters of said engine and generating an ignition command signal at said ignition timing, igniting means for generating high voltage for causing electric discharge across said gap between said electrodes of said at least one spark plug, sparking voltage-detecting means for detecting sparking voltage when said high voltage is generated by said igniting means, and misfire-determining means for determining based on said sparking voltage detected by sparking voltage-detecting means whether a misfire has occurred in said engine, the improvement comprising:

electric resistance-measuring means for measuring a value related to electric resistance across said gap between said electrodes of said at least one spark plug;

non-combustive state-determining means for determining whether the supply of fuel to the engine is interrupted indicating a non-combustive state;

abnormal resistance-determining means for determining whether said value related to said electric resistance measured by said electric resistance-measuring means assumes said value indicating that said electric resistance is below a predetermined value, when said engine is in said non-combustive state; and plug condition-determining means for determining that said at least one spark plug is abnormal, when it is determined by said abnormal resistance-determining means that said value related to said electric resistance assumes said value indicating that said electric resistance is below said predetermined value.

4. A misfire-detecting system according to claim 3, wherein said electric resistance-measuring means comprises:

voltage-measuring means for measuring voltage across said gap between said electrodes;

voltage-applying means for applying a predetermined voltage across said gap between said electrodes; and voltage dropping rate-measuring means for measuring a rate of dropping of said voltage measured by said voltage-measuring means, after said predetermined voltage is applied across said gap between said electrodes by said voltage-applying means.

* * * * *